July 22, 1947.   C. L. DENAULT   2,424,306
MOTOR PLUGGING BRAKE
Filed Jan. 12, 1946   3 Sheets-Sheet 1

INVENTOR
Clinton L. Denault.
BY
Franklin E. Hardy
ATTORNEY

July 22, 1947. C. L. DENAULT 2,424,306
MOTOR PLUGGING BRAKE
Filed Jan. 12, 1946 3 Sheets-Sheet 2

WITNESSES:

INVENTOR
Clinton L. Denault.
BY
Franklin E. Hardy
ATTORNEY

Patented July 22, 1947

2,424,306

UNITED STATES PATENT OFFICE 2,424,306

MOTOR PLUGGING BRAKE

Clinton L. Denault, Sharpsville, Pa., assignor to Westinghouse Electric Corporation, East Pittsburgh, Pa., a corporation of Pennsylvania Application January 12, 1946, Serial No. 640,959

10 Claims. (Cl. 172—179)

This invention relates to electrical apparatus and particularly to circuit controlling apparatus for effecting the sudden stopping of an electrical motor upon interruption of the circuits applying the energizing current for operating the motor.

In many types of apparatus, such as tap-changing voltage regulators and similar electrical equipment, the mechanism is operated by a motor that is required to operate at high speed followed by a rapid deceleration of the motor speed to rest within a limited number of revolutions upon interruption of the motor circuit. In certain types of such electrical apparatus, it is customary to provide a braking mechanism of the friction type for stopping the motor, and the operating mechanism associated therewith, promptly upon the interruption of the motor driving circuit. Such braking mechanism is usually provided with biasing means for normally maintaining the brakes applied when the motor is de-energized and with electrically energized releasing means that are operated upon the energization of the motor to release the brakes.

It is well known that a motor may be braked dimensionally by reversing the connection of its leads to the power source to effect the supply of energy to the motor from the source in a direction to create a motor torque in the reverse direction to its direction of rotation. This operation is commonly termed "plugging" the motor. Certain difficulties occur in plugging a motor of the small size commonly employed in voltage regulators or similar equipment because the inertia of the moving parts is so small that the duration of time during which the reverse direction of power is required to be applied to the motor to bring it to a complete stop without reversing the direction of operation of the motor is very short.

It is an object of my invention to provide means for stopping a motor by supplying power thereto in a direction to reverse the motor torque and for interrupting the current supplied to effect such a reverse motor torque upon the stopping of the motor.

It is a further object of the invention to provide means of the above-indicated character employing a directional switch device having a friction clutch responsive to the direction of operation of the motor.

It is a still further object of the invention to provide means for locking the directional switch device in its neutral position after completion of the stopping of the motor and for unlocking the directional switch device to permit further operation thereof upon energization of the motor.

Other objects and advantages of my invention will be apparent from the following description of a preferred embodiment thereof, reference being had to the accompanying drawings in which.

Figure 1:
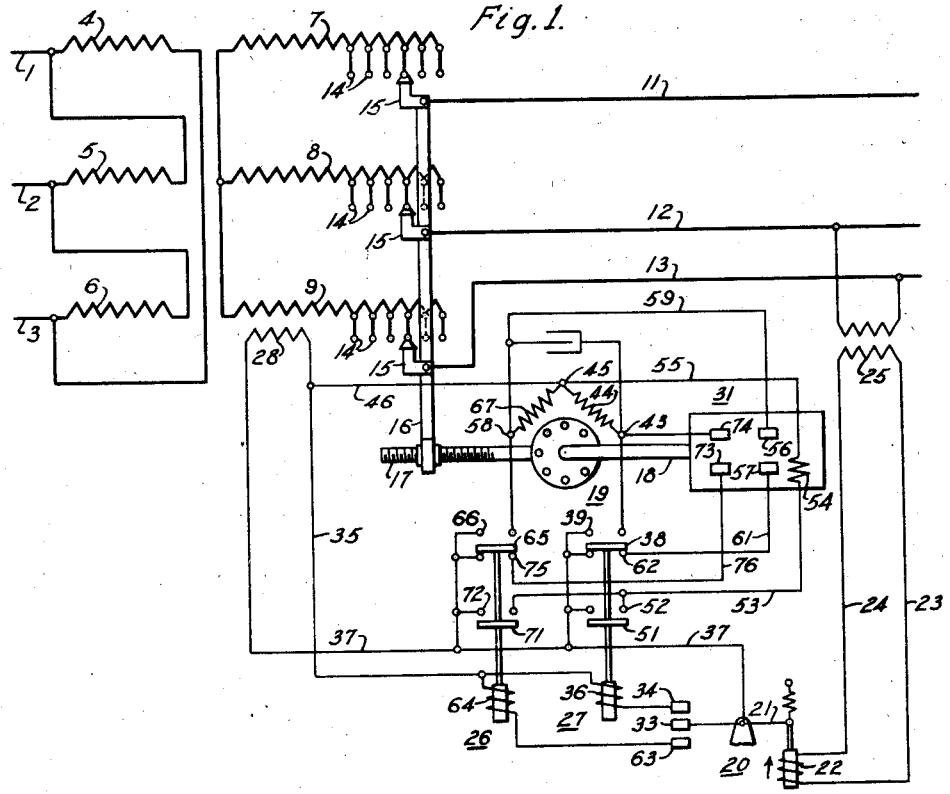
Fig. 1 is a diagrammatic view of apparatus and circuits illustrating an application of the invention to a tap-changing regulating transformer.

Referring to the drawings, and particularly to Fig. 1 thereof, conductors 1, 2 and 3 represent a three-phase alternating current circuit connected to primary transformer windings 4, 5 and 6 that are inductively related to the secondary windings 7, 8 and 9 through which energy is supplied to the three-phase circuit represented by circuit conductors 11, 12 and 13. A tap-changing mechanism is provided for varying the voltage ratio between the primary circuit conductors 1, 2 and 3 and the secondary circuit conductors 11, 12 and 13 which is diagrammatically illustrated as comprising a plurality of tap-changing switch contact members 14 connected to tap points on the secondary windings 7, 8 and 9 and cooperating with movable switch contact members 15 in each of the three phases that are similarly operated by mechanism illustrated as an arm 16, controlled by a screw threaded portion 17 of a shaft 18 that is operated through suitable mechanism by a motor 19.

Control equipment for the tap-changing mechanism is provided, comprising a circuit controller or primary relay 20, having a pivoted arm 21 and an armature controlled by an operating winding 22 that is connected by conductors 23 and 24 to a transformer winding 25 that is energized as a measure of the voltage between conductors 12 and 13 corresponding to the secondary circuit voltage to be regulated. The primary relay 20 controls secondary relays 26 to 27 to supply power from a transformer winding 28, shown as inductively related to the secondary winding 9, to the motor 19 to effect operation of the motor in the one or in the other direction to maintain the desired voltage on the power circuit conductors 11, 12 and 13. A directional switch device 31, which may be termed a pre-set motor plugging switch, is provided and is operated in accordance with the rotation of the motor shaft 18.

If the voltage of the secondary circuit drops below the desired value, the energization of the primary relay winding 22 is decreased permitting the armature to drop and the voltage contact member 33 to engage the contact member 34 to complete a circuit from the transformer winding 28 through conductor 35, the winding 36 of the relay 27, contact members 34 and 33 and conductor 37 to the transformer winding 28. The relay 27 is thus energized causing the relay contact member 38 to move upwardly and close a circuit from the transformer winding 28 through conductor 37, relay contact members 38 and 39 to the motor terminal 43 through the motor phase winding 44 to the motor terminal 45 and by conductor 46 back to the transformer 28, thus causing the motor 19 to operate in a direction to effect an operation of the tap-changing mechanism to cause an increase in the voltage on the secondary conductors 11, 12 and 13.

Upon the operation of the relay 27 as above described, the contact member 51 is moved upwardly into engagement with the contact members 52 to close a circuit from conductor 37 through contact members 51 and 52, conductor 53, the winding 54 of an electro-magnet and conductors 55 and 46 to the opposite side of the transformer winding 28 for the purpose of energizing the winding 54, and thereby unlocking the directional switch device 31 in a manner to be later explained. Upon operation of the motor 19 and the energization of the winding 54 of the directional switch device 31, contact members 56 and 57 are brought into engagement in a manner to be later explained, closing one point in a pre-set braking circuit extending from the motor terminal 58 through conductor 59, contact members 56 and 57, conductor 61 to relay contact member 38, when in its illustrated or lower position in contact with the contact members 62, and through conductor 37 to the transformer winding 28. This pre-set circuit is completed upon the de-energization of the motor relay 27, causing relay contact member 38 to drop to its lower or illustrated position in engagement with the contact members 62. The completed pre-set or motor plugging circuit supplies energy to the motor 19 causing it to develop a torque counter to its direction of rotation, thus rapidly bringing the motor to a stop. Upon the stopping of the motor 19, by application of a motor torque in a direction counter to its direction of rotation, the motor tends to reverse its direction of rotation, and in doing so causes the switch contact members 56 and 57 of the directional switch device 31 to separate to interrupt the pre-set or plugging circuit so as to prevent operation of the motor in the reverse direction. The manner of operation of the directional switch device 31 to effect the separation of the contact members 56 and 57 will be later described.

Upon the deenergization of the relay 27, the contact member 51 is separated from engagement with the contact members 52, thus interrupting the energization of the winding 54, thus effecting locking the directional switch device 31 to prevent reverse operation of the switch device. If the voltage of the secondary circuit comprising conductors 11, 12 and 13 increases above the desired value, the primary relay 20 operates, causing the contact member 33 to engage the contact member 63, thus closing a circuit through the winding 64 of the secondary relay 26, causing the relay contact member 65 to move upwardly and engage the contact members 66, closing a circuit from the transformer winding 28 through conductor 37, the relay contact members 66 and 65 to the motor terminal 58, through the motor winding 67, the terminal 45 and conductor 46, back to the transformer winding 28, to cause the motor 19 to operate the tap-changing mechanism in a direction to decrease the voltage of the secondary circuit represented by conductors 11, 12 and 13. When the relay 26 is energized, the relay contact member 71 is also brought into engagement with the contact member 72, thus closing a circuit from the transformer winding 28 through conductor 37, relay contact members 71 and 72, conductor 53, the electro-magnet winding 54, conductors 55 and 46, to the transformer winding 28, thus energizing the winding 54 and thereby unlocking the directional switch device 31 to permit operation thereof. When the directional switch device 31 is thus unlocked and the motor 19 is operated to increase the secondary circuit voltage, switch contact members 73 and 74 are operated into circuit closing relation to close one point in a pre-set motor plugging circuit that will be completed when the secondary relay 26 is de-energized, thus bringing the relay contact member 65 to its illustrated position in engagement with the relay contact members 75. This motor plugging circuit extends from the transformer winding 28 through conductor 37, relay contact members 75 and 65, conductor 76, switch contact members 73 and 74 to the motor terminal 43, through the motor winding 44 to the motor terminal 45 and through conductor 46 to the transformer winding 28.

When the voltage on the secondary circuit conductors 11, 12 and 13 reaches the desired value, the relay 20 will operate to separate the contact members 33 and 63, deenergizing the relay 26 and causing the relay contact member 63 to drop to its lower or illustrated position, interrupting the motor energizing circuit and completing the above traced motor plugging circuit through the secondary relay contact members 65 and 75 and the directional switch contact members 73 and 74, thus applying a torque to the motor 19 in a direction opposite to its direction of rotation, so as to bring the motor to a quick stop. When the motor is brought to a stop in this manner, it tends to reverse its direction of rotation, and in so doing, causes the contact members 73 and 74 of the directional switch device 31 to separate, thus interrupting the motor circuit.

Upon the de-energization of the relay 26, the contact member 71 is also separated from engagement with the contact members 72, thus interrupting the energization of the winding 54 of the electro-magnet, thus again locking the directional switch device in a manner to be later explained to prevent a reverse operation of the switch device.

Figure 2:
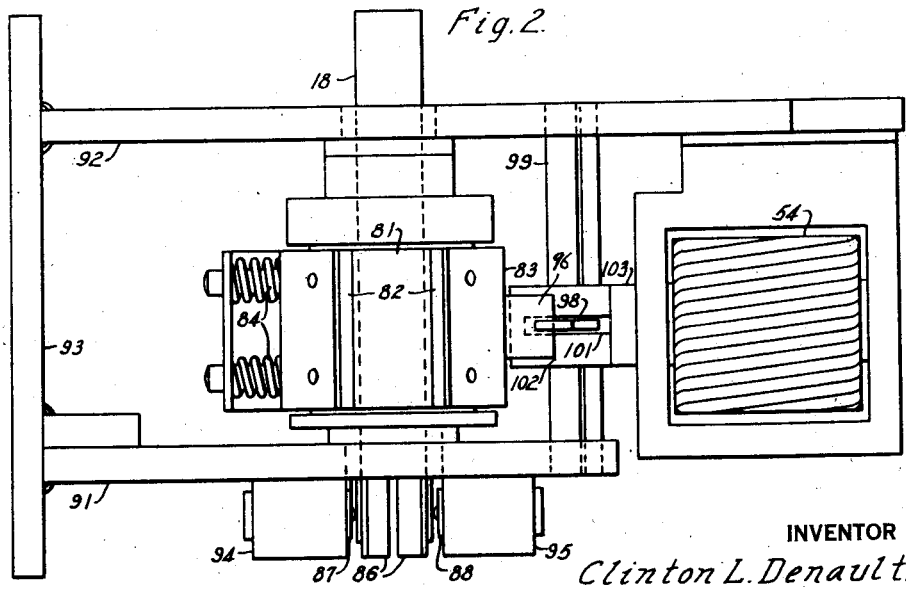
Fig. 2 is a top plan view of a directional switch device comprising a preferred embodiment of the invention.
Figure 3:
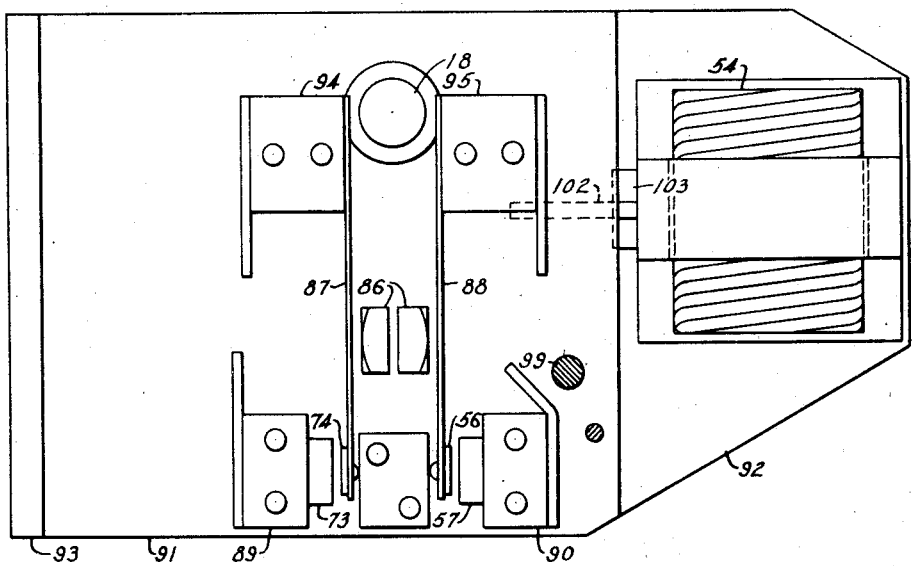
Fig. 3 is an outer end view of the directional switch device illustrated in Fig. 2.
Figure 4:
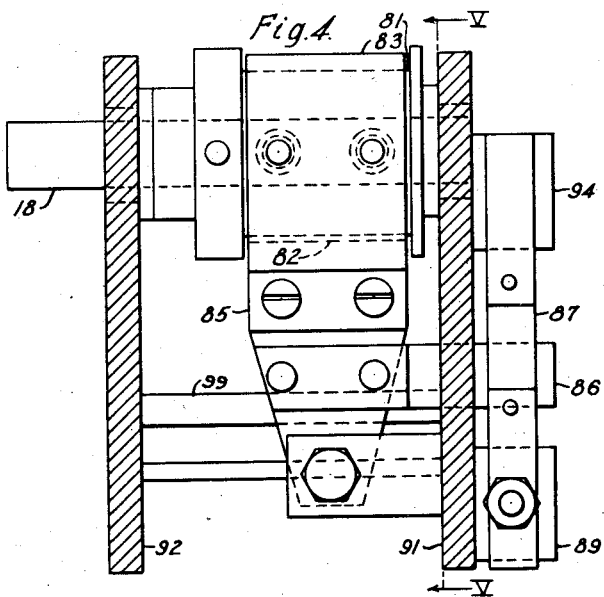
Fig. 4 is a side elevational view of the directional switch device shown in Fig. 2, parts being shown in section.
Figure 5:
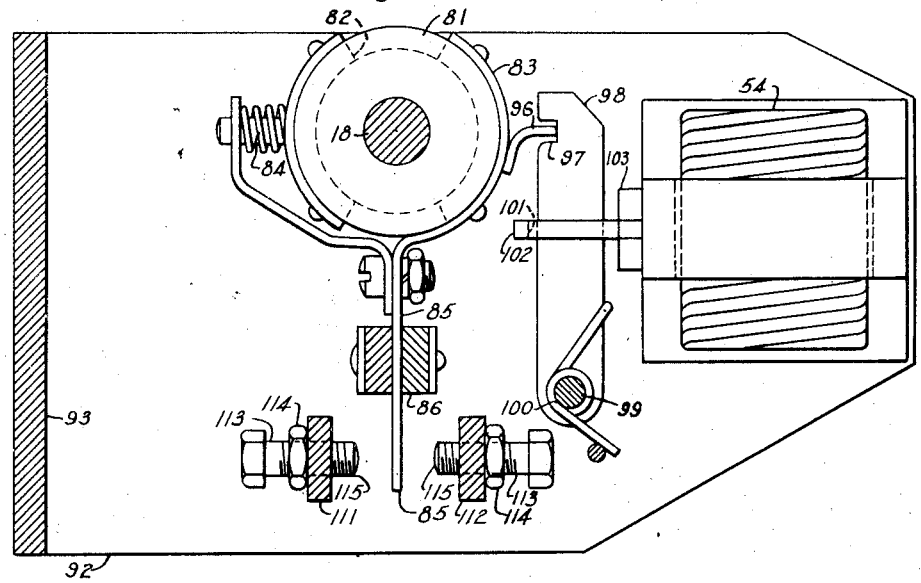
Fig. 5 is a view partly in elevation and partly in section taken along the line V—V in Fig. 4.

Referring to Figs. 2, 3, 4 and 5, a brake drum 81 is mounted on the shaft 18 to rotate therewith. A switch-operating structure, including brake shoes 82, is carried by a frame 83 and biased by a spring 84 to frictionally engage the surface of the brake drum. A brake arm 85 extends radially from the frame 83 and carries a contact operating bar 86 that is positioned between two resilient leaf spring members 87 and 88, each of which carries one of the contact members of the directional switch device 74 or 56 that are adapted to engage contact members 73 or 57 respectively. The contact members 73 or 57 are held in suitable supports 89 and 90 respectively, that are mounted on a side plate 91, which together with a side plate 92 and a base plate 93, comprise a switch supporting frame for the directional switch device. The upper ends of the leaf spring members 87 and 88 as viewed in Fig. 3 are mounted on supports 94 and 95, carried by the side plate 91. A locking finger 96 extends from the frame 83 as best shown in Fig. 5, and is illustrated as being positioned in a slot 97 in a locking lever 98 that is pivotally supported at 99 and is biased by a spring 100 so as to move toward the frame 83, carrying the brake shoes 82 and the switch operating arm 85. The locking lever 98 extends through a slot 101 in a member 102 attached to a plunger 103, comprising the armature of an electro-magnet that is energized by the winding 54, the circuit of which is traced and described with respect to Fig. 1. A pair of stops are provided on the opposite sides of the outer end of the brake arm 85, comprising brackets 111 and 112 extending outwardly from the side plate 91 and through which set screws 113 extend and are held in position by lock nuts 114. The inner ends 115 of the set screws 113 are adapted to engage the brake arm 85 to limit its movement in either direction. The screws 113 are so set that the amount of movement of the brake arm 85 that is permitted will effect the closing of the pairs of contact members 73 and 74, or 56 and 57, depending upon the direction of movement of the switch operating mechanism.

When the motor 19 is at rest, the parts of the switch operating mechanism are in the positions illustrated in Figs. 2, 3, 4 and 5. Upon the energization of the motor 19, the electro-magnet winding 54 is also energized, thus moving the locking arm 98 out of engagement with the locking finger 96 carried on the switch operating structure frame 83, thus permitting the switch operating structure to be moved by frictional engagement between the brake shoes 82 and the brake drum 81 in accordance with the direction of the movement of the shaft 18, so as to close the one or the other of the two pairs of switch contact members 73 and 74, or 56 and 57, for presetting the motor plugging circuit. This circuit, as above explained, will be completed when the directional relay 26 or 27 determining the direction of operation of the motor 19 is de-energized and dropped to its lower position as illustrated in Fig. 1. As above explained, the pre-set circuit, or motor plugging circuit, will cause the motor to develop a torque counter to its direction of rotation so as to bring the motor to a quick stop. This counter torque tends to cause the motor to operate in the opposite direction after coming to a stop. This tendency, however, is prevented by separation of the switch contact members that are closed by operation of the arm 85, and the switch operating structure including the arm 85 is prevented from operation beyond its neutral point by engagement between the locking finger 96 and the locking lever 98. As above described, the winding 54 of the electro-magnet is de-energized when the motor plugging circuit is completed upon de-energization of either of the directional relays 26 or 27, so that the locking lever 98 is free to move toward the left, as viewed in Fig. 5, and is biased in that direction by the spring 100 so that the end of the locking finger 96 will rest upon the outer surface of the locking lever 98 adjacent the notch 101, and will slip into this notch as soon as the switch operating mechanism moves in a direction to separate whichever one of the pairs of contact members 56 and 57, or 73 and 74, are held in their closed position, thus locking the switch operating structure in its neutral position, which is illustrated in the several views of the drawing.

Figure 6:
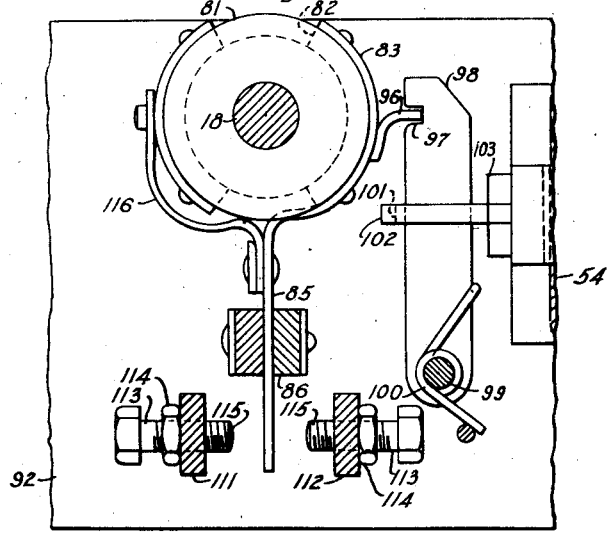
Fig. 6 is a view similar to Fig. 5 showing a modification of certain features.

Fig. 6 shows a modification of the switch operating structure which is generally similar to that shown in Fig. 5, but is provided with a leaf spring 116 forming a part of the frame 83 and carrying one of the brake shoes 82, thus using a part of the frame structure as the biasing means for the brake shoes instead of employing the separate coil springs 84 shown in Figs. 2 and 5.

It will be obvious to one skilled in the art that many modifications in the details of construction illustrated and described may be made within the spirit of invention and I do not wish to be limited otherwise than by the scope of the appended claims.

I claim as my invention:

1. In a motor driven electrical apparatus, in combination, a motor, a pair of directional relays for controlling the operation of the motor in the one or the other of two directions of rotation, a pair of motor plugging circuits, a preset motor plugging switch device comprising a pair of motor plugging switches, a shaft and brake drum operably connected to rotate in accordance with the rotation of said motor, a switch operating structure mounted for movement in the one or in the other direction from a neutral position in accordance with the direction of rotation of the brake drum comprising a frame rotatably mounted about the axis of the drum, brake shoes mounted on the frame and biased into engagement with the brake drum for effecting movement of the frame in accordance with the direction of rotation of the brake drum, said preset plugging switch device including two switches responsive to the movement of the switch operating structure in the one or in the other direction from its neutral position for closing the one or the other of said two switches, means responsive to the movement of a directional relay to a motor interrupting position to complete a motor plugging circuit, said preset plugging switch device being effective upon the stopping of the motor to interrupt said plugging circuit, a locking finger on said frame and a spring biased locking lever for engaging the locking finger when the switch operating structure is in its neutral position and an electric magnet energized upon energization of the motor for operation in a motoring direction for operating the locking lever to release engagement thereof to permit operation of the switch operating structure in accordance with the rotation of the brake drum.

2. A directional switch device comprising a shaft operable in either of two directions of rotation, two pairs of switch contact members, a brake drum connected to rotate in the one or in the other direction in accordance with the rotation of said shaft, a switch operating assembly mounted for movement in the one or the other direction from a neutral position in accordance with the direction of rotation of the drum comprising a frame rotatable about the axis of the drum, means operable upon movement of the switch operating assembly in the one or the other direction from the neutral position for closing the one or the other of said pairs of switch contact members and for retaining the contact members closed upon continuous rotation of the brake drum in the given direction and for retaining the contact members closed so long as the brake drum continues to rotate in the given direction, spring biased locking means for preventing the over-travel of the switch operating assembly beyond its neutral position upon the stopping of the rotation of the brake drum, and means operable upon initiation of the rotation of the shaft and brake drum in either direction for rest for releasing the locking means to permit operation of the switch operating assembly.

3. In a motor driven electrical apparatus, in combination, a motor, a pair of directional relays for controlling the operation of the motor in the one or the other direction of rotation, a pair of motor plugging circuits, a preset motor plugging switch device comprising a pair of motor plugging switches, a shaft operably connected to rotate in the one or in the other direction of rotation in accordance with the rotation of said motor, a brake drum connected to rotate in the one or in the other direction in accordance with the rotation of said shaft, a switch operating assembly mounted for movement in the one or in the other direction from a neutral position in accordance with the direction of rotation of the brake drum comprising a frame rotatable about the axis of the drum, brake shoes mounted on the frame and biased into engagement with the brake drum, a brake arm extending radially from the frame, a contact operating bar carried by said arm, a pair of movable switch contact carrying arms positioned on opposite sides of the contact operating bar and arranged to be engaged and operated thereby upon movement of the brake arm in the one or in the other direction from its neutral position, said pairs of movable switch contact carrying arms being operable for closing the one or the other of said two motor plugging switches, means responsive to the movement of a directional relay to a motor interrupting position to complete a motor plugging circuit, said preset plugging switch device being effective upon the stopping of the motor to interrupt said plugging circuit, a locking finger on said frame and a spring biased locking lever for engaging the locking finger when the switch operating structure is in its neutral position, and an electric magnet energized upon energization of the motor for operation in a motoring direction for operating the locking lever to release engagement thereof to permit operation of the switch operating structure in accordance with the rotation of the brake drum.

4. A directional switch device comprising a shaft operable in either of two directions of rotation, a brake drum connected to rotate in the one or in the other direction in accordance with the rotation of said shaft, a switch supporting frame, two pairs of switch contact members mounted on the switch supporting frame, a pair of leaf spring members spaced apart and extending in parallel relation and each carrying a movable contact member constituting one of the contact members of each of the two pairs of contact members, a switch operating structure mounted to move axially about the axis of said brake drum and carrying brake shoes and means for biasing the brake shoes into engagement with said brake drum to effect movement of the switch operating structure in the one or in the other direction from a neutral position in accordance with the direction of rotation of the brake drum, a brake arm extending radially from the frame, a contact bar carried by said arm and positioned between said pair of leaf spring members for closing the one or the other of said pairs of switch contact members upon movement of the switch operating structure in the one or in the other direction from the neutral position and for retaining the contact members closed upon continuous rotation of the brake drum in the given direction and for retaining the contact members closed so long as the brake drum continues to rotate in the given direction and for separating the contact members upon the stopping of the rotation of said drum, spring biased locking means for preventing travel of the switch operating structure past its neutral position and for retaining the switch operating structure in its neutral position while the shaft and brake drum are not rotating, and means operable upon further rotation of the shaft and brake drum in either direction for releasing the locking means to permit operation of the switch operating structure.

5. In a motor driven electrical apparatus, in combination, a motor, a pair of directional relays for controlling the operation of the motor in the one or the other of two directions of rotation, a pair of motor plugging circuits, a preset motor plugging switch device comprising a pair of motor plugging switches, a shaft and brake drum operably connected to rotate in accordance with the rotation of said motor, a switch operating structure mounted for movement in the one or in the other direction from a neutral position in accordance with the direction of rotation of the brake drum comprising a frame rotatable about the axis of the drum, brake shoes mounted on the frame and biased into engagement with the brake drum for effecting movement of the frame in accordance with the direction of rotation of the brake drum, said preset plugging switch device including two switches responsive to the movement of the switch operating structure in the one or in the other direction from its neutral position for closing the one or the other of said two switches, means responsive to the movement of a directional relay to a motor interrupting position to complete a motor plugging circuit, said preset plugging switch device being effective upon the stopping of the motor to interrupt said plugging circuit, spring biased locking means for preventing the overtravel of the switch operating structure beyond its neutral position upon the stopping of the rotation of the motor, and means operable upon energization of the motor for operation in either direction from rest for releasing the locking means to permit operation of the switch operating structure in accordance with the rotation of the motor.

6. A directional switch device comprising a shaft operable in either of two directions of rotation, two pairs of switch contact members, a switch operating assembly mounted for movement in the one or the other direction from a neutral position in accordance with the direction of rotation of the shaft, means operable upon movement of the switch operating assembly in the one or the other direction from the neutral position for closing the one or the other of said pairs of switch contact members and for retaining the contact members closed upon continuous rotation of the shaft in the given direction and for retaining the contact members closed so long as the shaft continues to rotate in the given direction, spring biased locking means for preventing the overtravel of the switch operating assembly beyond its neutral position upon the stopping of the rotation of the shaft, and means operable upon initiation of the rotation of the shaft in either direction from rest for releasing the locking means to permit operation of the switch operating assembly.

7. In a motor driven electrical apparatus, in combination, a motor, a pair of directional relays for controlling the operation of the motor in the one or the other of two directions of rotation, a pair of motor plugging circuits, a preset motor plugging switch device comprising a pair of motor plugging switches, a switch operating structure mounted for movement in the one or in the other direction from a neutral position in accordance with the direction of rotation of the motor, said preset plugging switch device including two switches responsive to the movement of the switch operating structure in the one or in the other direction from its neutral position for closing the one or the other of said two switches, means responsive to the movement of a directional relay to a motor interrupting position to complete a motor plugging circuit, said preset plugging switch device being effective upon the stopping of the motor to interrupt said plugging circuit, spring biased locking means for preventing overtravel of the switch operating structure beyond its neutral position upon the stopping of the rotation of the motor, and electro-responsive means energized upon energization of the motor for operation in either direction from rest for releasing the locking means to permit operation of the switch operating structure in accordance with the rotation of the motor.

8. In a motor driven electrical apparatus, in combination, a motor, a pair of directional relays for controlling the operation of the motor in the one or the other direction of rotation, a pair of motor plugging circuits, a preset motor plugging switch device comprising a pair of motor plugging switches, a shaft operably connected to rotate in the one or in the other direction of rotation in accordance with the rotation of said motor, a brake drum connected to rotate in the one or in the other direction in accordance with the rotation of said shaft, a switch operating assembly mounted for movement in the one or in the other direction from a neutral position in accordance with the direction of rotation of the brake drum comprising a frame rotatable about the axis of the drum, brake shoes mounted on the frame and biased into engagement with the brake drum, a brake arm extending radially from the frame, a contact operating bar carried by said arm, a pair of movable switch contact carrying arms positioned on opposite sides of the contact operating bar and arranged to be engaged and operated thereby upon movement of the brake arm in the one or in the other direction from its neutral position, said pairs of movable switch contact carrying arms being operable for closing the one or the other of said two motor plugging switches, means responsive to the movement of a directional relay to a motor interrupting position to complete a motor plugging circuit, said preset plugging switch device being effective upon the stopping of the motor to interrupt said plugging circuit, spring biased locking means for preventing the overtravel of the switch operating structure beyond its neutral position upon the stopping of the rotation of the motor, and means operable upon energization of the motor for operation in either direction from rest for releasing the locking means to permit operation of the switch operating structure in accordance with the rotation of the motor.

9. In a motor driven electrical apparatus, in combination, a motor, a pair of directional relays for controlling the operation of the motor in the one or the other direction of rotation, a pair of motor plugging circuits, a preset motor plugging switch device comprising a pair of motor plugging switches, a switch operating assembly mounted for movement in the one or in the other direction from a neutral position in accordance with the direction of rotation of the motor, comprising a rotatably mounted frame, a brake arm extending radially from the frame, a contact operating bar carried by said arm, a pair of movable switch contact carrying arms positioned on opposite sides of the contact operating bar and arranged to be engaged and operated thereby upon movement of the brake arm in the one or in the other direction from its neutral position, said pairs of movable switch contact carrying arms being operable for closing the one or the other of said two motor plugging switches, means responsive to the movement of a directional relay to a motor interrupting position to complete a motor plugging circuit, said preset plugging switch device being effective upon the stopping of the motor to interrupt said plugging circuit, the switch operating structure beyond its neutral position upon the stopping of the rotation of the motor, and electro-responsive means energized upon energization of the motor for operation in either direction from rest for releasing the locking means to permit operation of the switch operating structure in accordance with the rotation of the motor.

10. A directional switch device comprising a shaft operable in either of two directions of rotation, a switch supporting frame, two pairs of switch contact members mounted on the switch supporting frame, a pair of leaf spring members spaced apart and extending in parallel relation and each carrying a movable contact member constituting one of the contact members of each of the two pairs of contact members, a switch operating structure arranged to effect movement of the switch operating structure in the one or in the other direction from a neutral position in accordance with the direction of rotation of the shaft, a brake arm extending radially from the frame, a contact bar carried by said arm and positioned between said pair of leaf spring members for closing the one or the other of said pairs of switch contact members upon movement of the switch operating structure in the one or in the other direction from the neutral position and for retaining the contact members closed upon continuous rotation of the shaft in the given direction and for retaining the contact members closed so long as the shaft continues to rotate in the given direction and for separating the contact members upon the stopping of the rotation of said shaft, spring biased locking means for preventing travel of the switch operating structure past its neutral position and for retaining the switch operating structure in its neutral position when the shaft is not rotating, and means operable upon further rotation of the shaft in either direction for releasing the locking means to permit operation of the switch operating structure.

CLINTON L. DENAULT.

REFERENCES CITED

The following references are of record in the file of this patent:

UNITED STATES PATENTS

| Number | Name | Date |
| --- | --- | --- |
| 1,440,803 | Uphoff | Jan. 2, 1923 |
| Re. 18,238 | Whittingham | Oct. 27, 1931 |